United States Patent Office 3,716,515
Patented Feb. 13, 1973

3,716,515
PROCESS OF MAKING SHELF-STABLE MIXTURES OF THIOL, OXIDIZER AND ACCELERATOR PRECURSOR
Gerhard Wilhelm, Viernheim, Lothar Hockenberger, Ludwigshafen, and Manfred Soyka, Lampertheim, Germany, assignors to Rutgerswerke Aktiengesellschaft, Frankfurt am Main, Germany
No Drawing. Filed June 14, 1971, Ser. No. 152,965
Claims priority, application Germany, Feb. 19, 1971, P 21 07 971.0
Int. Cl. C08g 51/04
U.S. Cl. 260—37 R     6 Claims

ABSTRACT OF THE DISCLOSURE

Mixtures based on liquid monomeric, oligomeric, or polymeric compounds having one or more terminal mercapto groups, containing as hardening agents peroxides of zinc or cadmium and, if desired, fillers, plasticizers and similar additives, are prepared by adding to said mixtures reaction products of Grignard compounds corresponding to the formula RMgX, wherein R stands for a lower alkyl or a phenyl-group and X stands for a halogen, with nitriles or amines, which react with the atmospheric moisture to form compounds which release and accelerate the oxidation reaction.

Polymers having terminal mercapto groups, in which the latter may be oxidized with oxidizing agents, such as, for example $PbO_2$, $MnO_2$, $ZnO_2$, cumene hydroperoxide, and others, to disulfide bonds with the formation of rubber-like, elastic materials, have a large field of use, e.g. as caulking materials, sealing materials or molding materials, in view of their very good stability and resistance to weathering and solvents.

In many cases, the use of two components, i.e. the compounds with terminal mercapto groups, on the one hand, and the oxidizing agent on the other hand, which must be mixed directly before being applied is of disadvantage. Moreover, the mixed components can be applied within a definite, limited period of time only. For this reason, according to the present invention mixtures are prepared which are stable in storage (i.e. shelf stable) and contain the polymer and the oxidizing agent together.

Oxidation can be carried out in a manner known by itself with $ZnO_2$ or $CdO_2$, and can be catalyzed with nitrogen bases, such as $NH_3$, primary, secondary, tertiary, amines, imines and others. Without the addition of such accelerators the compounds have almost unlimited self-stability.

It is, therefore, an object of the present invention to produce a shelf-stable, marcapto-terminated liquid polymer oxidizing agent mixture which cures upon exposure to atmospheric air, by adding to these mixtures an accelerating agent component, in precursor form which is hydrolyzed by the moisture of the air and sets free a nitrogen base.

The present invention consists in a process for producing mixtures which are shelf-stable and cure under the influence of atmospheric moisture, based on liquid monomeric, oligomeric, or polymeric compounds, containing one or more terminal mercapto groups and peroxides of zinc or cadmium and if desired, fillers, plasticizers and similar additives, and being characterized by adding, as curing-accelerators, reaction products of Grignard compounds of the general formula RMgX, where R is a lower alkyl or phenyl-group and where X is a halogen, with nitriles or amines and which react with atmospheric humidity to form compounds which release and accelerate the oxidation reaction. The added ketimino-magnesium-compounds and amino-magnesium-compounds, respectively, hydrolyze with $H_2O$ to ketimines and amines. The ketimines may further hydrolyze to the corresponding ketones and ammonia. The amines, as well as the ketimines and also ammonia, catalyze the $ZnO_2$— or the $CdO_2$— curing of the liquid polymers having terminal mercapto-groups at the end, i.e. one molecule is capable of inducing several oxidations of sulfhydryl-groups by $ZnO_2$ or $CdO_2$ respectively. At each of these oxidations one molecule of water is formed, which for its part can again set free one molecule of the nitrogen-base. Even assuming that a considerable amount of water formed by the oxidation is absorbed by the fillers or gets lost by diffusion, it is essentially inevitable in this system that a mixture made in accordance with the present invention cures completely without forming a disturbing barrier-layer.

The process of the present invention can be applied to all polymers or mixtures of monomeric, oligomeric and polymeric compounds, which have terminal mercapto groups, such as for example, polysulfide polymeric thioether and the like.

As $ZnO_2$ either the pure compound or any commercial product having a lower content of active oxygen, can be used. If necessary, in such a case the amount of zinc peroxide should be increased, so that in any case it is essentialy inevitable that all mercaptan-groups can be oxidized. In general 7–12% $ZnO_2$ based on the liquid polymer containing the mercapto groups at the end, will be capable of the desired curing. The same is valid for cadmium peroxide.

Cure can be obtained by using 5–100%—preferably 30–50%—of a magnesiumketimino-compound, or magnesium-amino-compound, based on the amount of the oxidizing agent zinc or cadmium peroxide.

The mixture prepared in accordance with the present invention is stable if stored in a container, which is protected from penetration of humidity. Curing of this mixture can be retarded by the addition of a small amount of a carboxylic acid based on the oxidizing agent such as for example adipic acid or benzoic acid, or the addition of a drying agent (e.g. CaO).

The ketiminomagnesium compounds used as catalysts can be prepared by reacting Grignard compounds with nitriles:

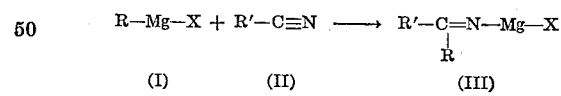

$$R-Mg-X + R'-C\equiv N \longrightarrow R'-C=N-Mg-X$$
$$\underset{R}{|}$$
(I)      (II)      (III)

As starting material for Grignard compounds (I) alkyl halides and also aryl halides can be used. Thereby it should be considered that the reactivity of the ketiminomagnesium compounds (III) is the highest when iodides are used and the smallest when chlorides are used. Similarly, the reactivity of aliphatic halides is lower than of aromatic halides. Furthermore, Grignard compounds prepared from n-alkylhalides give more active end products in comparison with those prepared from branched alkyl halides.

As a nitrile component, a nitrile of aliphatic, aromatic, and heterocyclic carboxylic acids can be used. All of the resulting reaction products of the invention accelerate the curing of a mixture consisting of a mercapto-terminated polymer and $ZnO_2$ and $CdO_2$, respectively. However, they differ sometimes essentially in reactivity.

The amino-magnesium compounds, which are likewise used as catalysts, are prepared by reaction of Grignard compounds with amine, which have at least one active hydrogen atom at the nitrogen as follows:

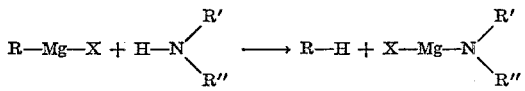

As amine aliphatic, cyclic and hetero-cyclic, primary and secondary amines can be used.

The following examples illustrate the present invention.

The polymer used in the examples is a polysulfide having the following average structure:

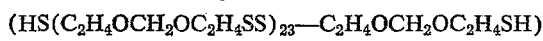

with about 0.5% by weight maximum cross-linking.

It has an average molecular weight of 4000 and a viscosity at 27° C. of 350–450 poises.

To the mixture plasticizers, such as phthalates or chlorinated hydrocarbons, pigments, fillers, thixotropic agents, and drying agents, such as e.g. calcium carbonate, clay, titanium dioxide, carbon black, barium oxide and others, may be added.

All proportions of ingredients are based on weight if not otherwise stated.

EXAMPLE 1

4.8 grams of magnesium were reacted in 30 ml. of ether and 30 ml. of benzene, with 28.4 grams of methyl iodide, in accordance with the general, and well known method for preparing Grignard compounds. After that, 8.2 grams acetonitrile were added. In an exothermic reaction acetone-imine-N-magnesium-iodide precipitated in yellow crystals and was filtered off in a dried atmosphere of nitrogen.

(a) 50 grams of the compound thus prepared were mixed with a mixture consisting of

| | Grams |
|---|---|
| Polysulfide-polymer | 1000 |
| Chalk | 200 |
| Clay | 200 |
| Titanium dioxide | 350 |
| Benzyl-butyl-phthalate | 350 |
| Dispersed $SiO_2$ | 40 |
| $ZnO_2$ | 100 |

The resulting mixture was divided in two parts. One part was stored in an open container in a normal climate (23° C. and 50% R.H.) while the second part was stored under equivalent conditions of climate, but in a closed container.

The mixture stored in an open container had after 2 days a thin skin and the further curing rate was about 1.5 mm. per day.

The mixture stored in a sealed container, was still liquid after 6 weeks. The mixture stored in an open container without the magnesium-imine-compound remained likewise liquid.

(b) Using the mixture described above in 1a), test specimens were prepared by placing mixture in 15 x 15 x 30 mm. joints between two prisms of concrete (each prism being 80 x 25 x 15 mm.).

The specimens were stored for 14 days in normal climate and then tested:

Modulus at 150% extension _____kg./cm.$^2$__ 2.6
Recovery after 60 minutes extension at
150% _____percent__ 73

(c) 50 grams of the described acetoneimine-N-magnesiumiodide were mixed with a mixture consisting of:

| | Grams |
|---|---|
| Polysulfide-polymer | 1000 |
| Chalk | 200 |
| Clay | 200 |
| Titanium dioxide | 350 |
| Benzyl-butyl-phthalate | 350 |
| Dispersed $SiO_2$ | 40 |
| $CdO_2$ | 100 | and, stored in open and sealed containers under normal climatic conditions (23° C. and 50% relative humidity).

The mixture stored in an open container was no more workable after 4 days and was cured through about 8 mm. after 12 days, while the mixture stored in the sealed container was still liquid.

The same mixture, to which, however, acetone-imine-N-magnesiumiodide was not added, remained liquid under equal conditions.

EXAMPLE 2

2.4 grams magnesium iodide were reacted according to the general method for preparing Grignard compounds in 30 ml. ether and 30 ml. benzene, with 11 grams ethyl bromide and then mixed with 4.1 grams of acetonitrile. After 1 hour, a white precipitate was formed, which was filtered off under an atmosphere of dry nitrogen.

5 grams of this substance were mixed with 200 grams of a mixture, analogously to the above Example 1 and was stored in normal climate (23° C. and 50% relative humidity) one sample in a sealed container and a second sample in an open container. The mixture stored in the open container was cured through 5 mm. after 6 days, while the mixture stored in the sealed container remained liquid.

EXAMPLE 3

2.4 grams magnesium were reacted with 12.6 grams benzyl-chloride in an ether-benzene-mixture. After the addition of 5.4 grams of adiponitrile a brown compound precipitated as the reaction product and was filtered off in a protective dry gas atmosphere.

In a cure-test carried out analogously to the above Example 1(a), the mixture stored in an open container was tack-free after 5 days, and had a skin of 2 mm. thickness after 7 days. The mixture stored in the sealed container was still liquid at this time.

EXAMPLE 4

6 grams of magnesium shavings were reacted in an ether-benzene mixture with 40 grams of bromobenzene. Then, 26 grams of benzonitrile were added. After some time, an exothermic reaction followed and benzophenone-imino-magnesium-bromide precipitated in white crystals and was filtered off in a dry, protective gas atmosphere.

In a cure-test—carried out in a manner analogous to the above Example 1(a)—the mixture stored in an open container had a thin skin after one day; was cured through about 5 mm. after 5 days, and after 8 days it was cured through 10 mm. while the compound stored in the sealed container, was still liquid.

EXAMPLE 5

To a solution of ethylmagnesiumbromide, prepared from 2.4 grams magnesium and 11 grams ethylbromide, in a mixture of ether and benzene, 10.4 grams 3-pyridine-carbonitrile, were dropwise added. The precipitated light-brown reaction product was filtered off in a dry, protective atmosphere.

In the cure-test carried out in analogous manner to Example 1(a), the mixture stored in an open container under normal conditions of climate, had after 72 hours a skin of 0.5 mm. thickness; after 5 days a skin of 3 mm. thickness and after 8 days it was cured through 10 mm. The sample stored in the sealed container was still liquid after this period of time.

EXAMPLE 6

Into a solution of ethylmagnesiumiodide prepared from 2.4 grams magnesium and 16 grams ethyliodide in an ether-benzene mixture, 9.3 grams 2-furan carbonitrile were added drop by drop under stirring. After filtering off the yellow-brown reaction product, the latter was tested in a cure-test in a manner analogous to the cure-test described in Example 1(a). In this test, the sample stored in an open container under normal climate conditions as defined above, a thin tack-free skin was formed after 1 day and the sample cured through 5 mm. after 5 days. The sample stored in a sealed container was still liquid after this period of time.

EXAMPLE 7

To an ether solution of methylmagnesiumiodide, prepared from 4.8 grams magnesium and 28.4 grams methyl iodide, 6 grams of dry ethylene diamine, were added. Under brisk formation of methane, a smeary product precipitated. After distilling off the ether on the rotary evaporator, a white powder was obtained which was tested in a cure-test in a manner analogous to that described in the above Example 1(a). Thereby, already after 18 hours the sample stored in an open container exhibited hardening on its surface and was cured through about 5 cm. after 4 days, while the sample stored in a sealed container was still liquid, after this period of time.

EXAMPLE 8

A solution of methylmagnesiumiodide in ether prepared by reaction of 2.4 grams magnesium and 14.2 grams methyl iodide was reacted with 10 grams of cyclohexylamine. Thereby, a slow formation of gas (methane) could be observed.

After carefully drawing off the ether on the rotary evaporator a residue of deep-brown liquid remained, which was tested in a cure-test in a manner analogous to that described in the above Example 1(a).

The mixture stored in an open container was cured through 5 mm. after 4 days; it was cured through 10 mm. after 8 days, while a sample stored in a sealed container was still liquid after this period of time.

EXAMPLE 9

To a solution of methylmagnesiumiodide in ether prepared from 2.4 grams of magnesium and 14.2 grams of methyliodide, 10.5 grams of piperidine dried over KOH were added. The reaction mixture became brown-colored with the formation of gas. The ether was drawn off on the rotary evaporator and the brown, smeary residue was tested in a cure-test in a manner analogous to that used in the above Example 1(a).

The mixture stored in an open container, had after 1 day a thin skin and was cured through 10 mm. after 8 days, while a mixture stored in a sealed container was still liquid after this period of time.

The expression "polymeric compounds having one or more mercapto groups at the end" refers to the so-called polysulfide polymers; polysulfides which are used as starting materials, are so-called liquid polymers. Several types of these liquid polymers have been known prior to present invention and all of these types can be reacted with the curing system claimed as a mixture in the present application.

A typical polysulfide polymer is a compound of the following formula:

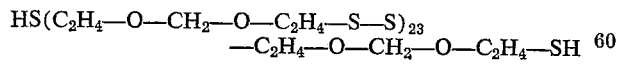

The liquid polysulfides, which are the starting material of the claimed process can be converted at ordinary room temperature into the rubberlike elastomeric condition according to the present invention.

What is claimed is:
1. An improved process for preparing a shelf-stable liquid mixture which is curable to a solid upon exposure to atmospheric moisture, comprising the steps of
   mixing a liquid polymer component having at least one terminal mercapto group with an oxidizing agent component selected from the class consisting of zinc peroxide and cadmium peroxide and an accelerating agent precursor component selected from the class consisting of:
   (a) a magnesiumketimino compound comprising the reaction product of a Grignard reagent and a nitrile selected from the class consisting of nitriles of aliphatic, aromatic and heterocyclic carboxylic acids, reacted together, before removing the solvent from the Grignard reagent, by mixing to induce a reaction, of the Grignard reagent and nitrile, in which a magnesiumketimino compound is formed, and
   (b) an amino-magnesium compound comprising the reaction product of a Grignard reagent and an amine having at least one active hydrogen bonded to a nitrogen component thereof, reacted together, before removing the solvent from the Grignard reagent, by mixing to induce a reaction, of the Grignard reagent and amine, in which an amino-magnesium compound is formed.

2. The improved process of claim 1 wherein said accelerating agent precursor component (a) is incorporated in the mixture and in an amount of 5 to 100 weight parts per 100 weight parts of oxidizing agent.

3. The improved process of claim 2 wherein acetone-imine-N-magnesium-iodide is prepared by Grignard reaction and separated from its reaction medium in a dried atmosphere and mixed with a polythiopoly-mercaptan liquid and said oxidizing agent.

4. A shelf stable liquid product made in accordance with claim 1.

5. Process in accordance with claim 1 wherein chalk filler is added to the mixture.

6. The improved process of claim 1 wherein said accelerating agent precursor component (b) is incorporated in the mixture and in an amount of 5 to 10 weight parts per 100 weight parts of oxidizing agent.

References Cited

UNITED STATES PATENTS

| | | | |
|---|---|---|---|
| 2,744,854 | 5/1956 | Urban, Jr. | 196—29 |
| 3,234,188 | 2/1966 | Warner | 260—79 |
| 3,275,579 | 9/1966 | Stierli et al. | 260—6 |
| 3,402,155 | 9/1968 | Kutch | 260—79 |
| 3,499,864 | 3/1970 | Millen | 260—338 |
| 3,586,660 | 6/1971 | Sakata et al. | 260—79 |

DONALD E. CZAJA, Primary Examiner

M. I. MARQUIS, Assistant Examiner

U.S. Cl. X.R.

161—182, 187; 260—312 R, 79, 79.1